United States Patent
Nakagawa

(10) Patent No.: US 9,778,474 B2
(45) Date of Patent: Oct. 3, 2017

(54) DISPLAY PANEL AND DISPLAY APPARATUS

(71) Applicant: Sakai Display Products Corporation, Sakai-shi, Osaka (JP)

(72) Inventor: Hidetoshi Nakagawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/905,219

(22) PCT Filed: Jul. 8, 2014

(86) PCT No.: PCT/JP2014/068207
§ 371 (c)(1),
(2) Date: Jan. 14, 2016

(87) PCT Pub. No.: WO2015/008666
PCT Pub. Date: Jan. 22, 2015

(65) Prior Publication Data
US 2016/0154246 A1  Jun. 2, 2016

(30) Foreign Application Priority Data
Jul. 19, 2013 (JP) ................................ 2013-150775

(51) Int. Cl.
*G02B 27/26* (2006.01)
*G02F 1/1333* (2006.01)

(52) U.S. Cl.
CPC ........... *G02B 27/26* (2013.01); *G02F 1/1333* (2013.01); *G02F 2001/133354* (2013.01)

(58) Field of Classification Search
CPC .............................. G02F 1/1333; G02B 27/26
See application file for complete search history.

(56) References Cited

U.S. PATENT DOCUMENTS 6,307,613 B1 * 10/2001 Iida .................... G02F 1/133528
349/110
6,930,745 B1 * 8/2005 Miyazaki .............. G02F 1/1339
349/152

(Continued)

FOREIGN PATENT DOCUMENTS

JP 2003-121828 A 4/2003
JP 2005-010738 A 1/2005

(Continued)

*Primary Examiner* — Hoan C Nguyen
(74) *Attorney, Agent, or Firm* — Rudy J. Ng; Bret E. Field; Bozicevic, Field & Francis LLP

(57) ABSTRACT

A display panel includes a plurality of display elements arranged in a matrix manner, a first transparent substrate including a plurality of signal input parts at a circumferential part of the first transparent substrate and a wiring connecting the signal input parts and the display elements formed on the first transparent substrate, and a second transparent substrate including a rectangular light shielding layer shielding light among the display elements and shielding light at an outside of a display region including the display elements, wherein markers for indicating positions with respect to the display elements are located in at least two parts of a circumferential edge of the first transparent substrate, and each of the markers has a crossing part crossing any one of rims at a circumferential edge of the light shielding layer.

15 Claims, 10 Drawing Sheets

(56) References Cited

U.S. PATENT DOCUMENTS

| | | |
|---|---|---|
| 2003/0067569 A1 | 4/2003 | Chang et al. |
| 2005/0012228 A1* | 1/2005 | Hiramatsu ........ H01L 21/02422 257/797 |
| 2006/0290874 A1 | 12/2006 | Yoon et al. |
| 2010/0265433 A1 | 10/2010 | Hoshi |
| 2010/0271572 A1 | 10/2010 | Yokogawa |

FOREIGN PATENT DOCUMENTS

| | | |
|---|---|---|
| JP | 2007-04111 A | 1/2007 |
| JP | 2008257014 A * | 10/2008 |
| JP | 4508280 B2 | 7/2010 |
| JP | 2010-271691 A | 12/2010 |

\* cited by examiner

DISPLAY PANEL AND DISPLAY APPARATUS

CROSS-REFERENCE TO RELATED APPLICATIONS

This application is the national phase of PCT International Application No. PCT/JP2014/068207 which has an International filing date of Jul. 8, 2014 and designated the United States of America.

FIELD

The present application relates to a display panel and a display apparatus to which a structure such as a patterned retardation film is attached.

BACKGROUND

As one of stereoscopic video display systems, a display system of a passive type (polarized glass type) is known. In this display system, light emitted from a liquid crystal panel is brought to be in two different types of polarization states, and polarized glasses, which are configured with a polarization plate allowing the passage of only one type of polarized light being directed to the right eye and a polarization plate allowing the passage of only the other type of polarized light being directed to the left eye, are used to view a display screen, so that an image may be recognized as a stereoscopic image.

In order to bring the light emitted from a liquid crystal panel into two different types of polarization states, a patterned retardation film is utilized (see Japanese Patent No. 4508280, for example). The patterned retardation film is configured to include a patterned retardation layer and to allow the passage of linearly polarized light, so as to convert the linearly polarized light passing through each region into two types of circularly polarized light (or elliptically polarized light) with different polarization states.

Such a patterned retardation film is bonded to a liquid crystal panel, so that linearly-polarized light passing through the liquid crystal panel may be converted into two types of circularly polarized light (or elliptically polarized light) with different polarization states.

Thus, a video image for the right eye and a video image for the left eye are independently displayed in one screen, and the video image for the right eye is converted into one polarization state while the video image for the left eye is converted into the other polarization state, so that the video images may be recognized as a stereoscopic video image when viewed through the polarized glasses described above.

SUMMARY

In the stereoscopic video display of a passive type, it is necessary to make one of two types of retardation regions in the patterned retardation film correspond to a group of pixels in a display region where a video image for the right eye is displayed while making the other one of the retardation regions correspond to a group of pixels in a display region where a video image for the left eye is displayed. The positional accuracy at the time of bonding the patterned retardation film to a liquid crystal panel has therefore been desired.

Conventionally, a technique has been proposed in which a black matrix as a light shielding layer included in a liquid crystal panel is processed to form a comb-like alignment mark indicating the reference for a bonding position, and a polarization plate is aligned using such an alignment mark as a reference (see Japanese Patent Laid-Open No. 2007-4111, for example).

However, in order to form an alignment mark described in Japanese Patent Laid-Open No. 2007-4111, it is necessary to scrape off the black matrix on a color filter substrate, which may possibly generate a gap at the portion of the alignment mark and may cause the light from the backlight to leak through the gap.

The present application has been made in view of the circumstances described above, and has an object of providing a display panel and a display apparatus in which a marker may be arranged, on a substrate, which indicates a reference for an attachment position of a structure such as a patterned retardation film without the need for processing the black matrix.

A display panel according to the present application includes a plurality of display elements arranged in a matrix manner, a first transparent substrate including a plurality of signal input parts at a circumferential part of the first transparent substrate and a wiring connecting the signal input parts and the display elements formed on the first transparent substrate, and a second transparent substrate including a rectangular light shielding layer shielding light among the display elements and shielding light at an outside of a display region including the display elements, wherein markers for indicating positions with respect to the display elements are located in at least two parts of a circumferential edge of the first transparent substrate, and each of the markers has a crossing part crossing any one of rims at a circumferential edge of the light shielding layer.

The display panel according to the present application, wherein the crossing part crosses any one of the rims at the circumferential edge of the light shielding layer at an angle of approximately ninety degrees.

The display panel according to the present application, wherein the marker is provided at an outer side of a seal member for bonding the first transparent substrate to the second transparent substrate.

The display panel according to the present application, wherein the marker is formed with a same material as a material of the wiring.

The display panel according to the present application, wherein the marker is provided in a region not overlapping with the signal input parts.

The display panel according to the present application, further includes a structure attached onto the second transparent substrate, and restricted for an attachment position depending on an arrangement of the display elements.

The display panel according to the present application, wherein the structure is a patterned retardation film converting a polarization state of light transmitted through the first and second transparent substrates into two different types of polarization states.

A display panel according to the present application includes the display panel and a driving part driving a plurality of display elements included in the display panel.

According to the present application, a marker (an alignment mark) indicating the reference for a position for attachment of a structure such as a patterned retardation film may be formed, without an addition of a new procedure, on a TFT-side glass substrate on which TFT wirings and the like are formed. Such an alignment mark may be a cause of electrostatic discharge (ESD) depending on the shape of the alignment mark if formed from the black matrix. In the present application, however, the alignment mark may be formed in the same procedure as that for forming the TFT wirings for example, which may therefore suppress the occurrence of electrostatic discharge.

The above and further objects and features of the invention will more fully be apparent from the following detailed description with accompanying drawings.

DESCRIPTION OF EMBODIMENTS

As an application example of the present invention, a liquid crystal display panel provided with a patterned retardation film will specifically be described below with reference to the drawings.

Figure 1:
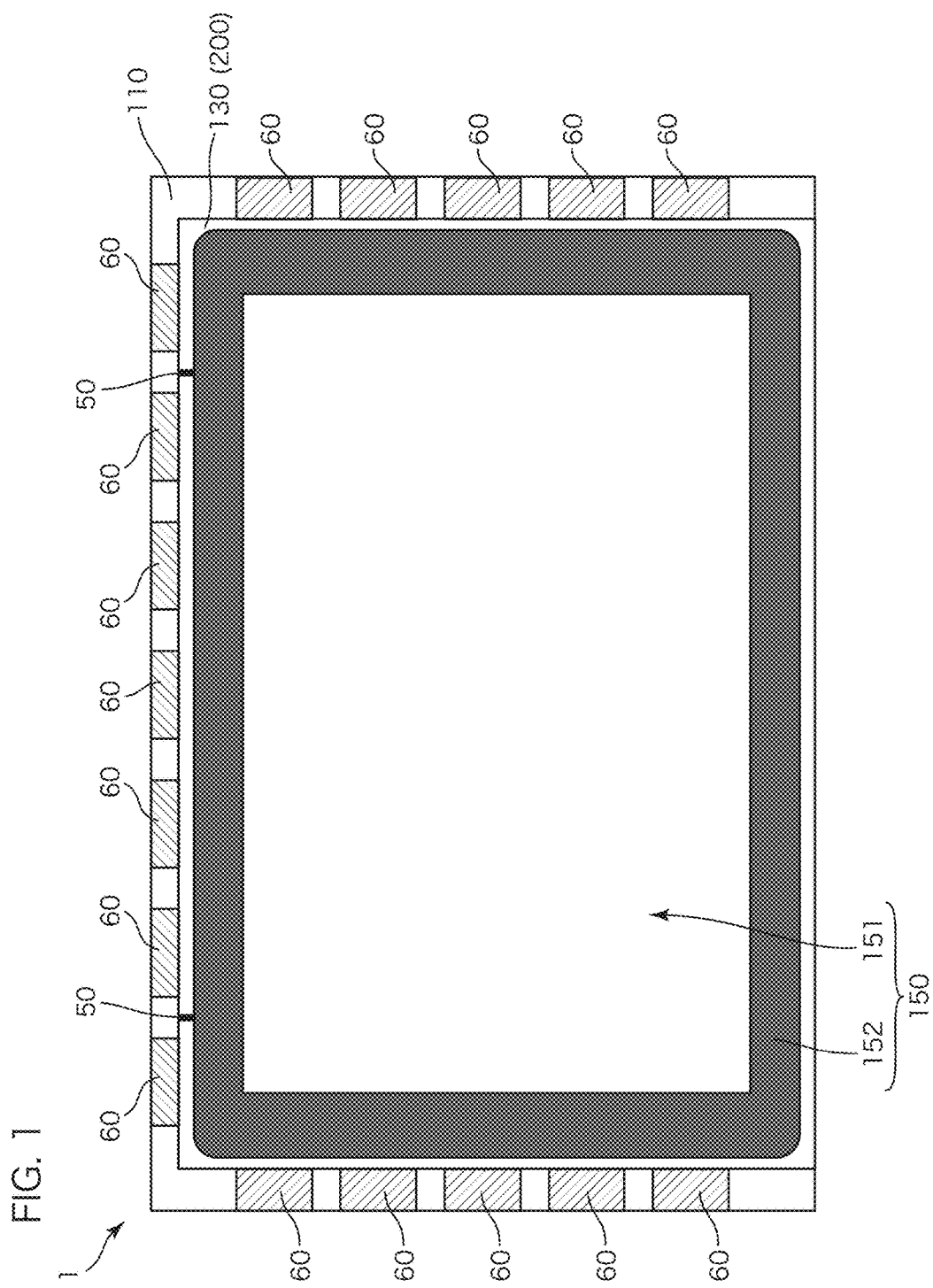
FIG. 1 is a plan view illustrating the configuration of a main part of a liquid crystal display panel according to an embodiment of the present application.
Figure 2:
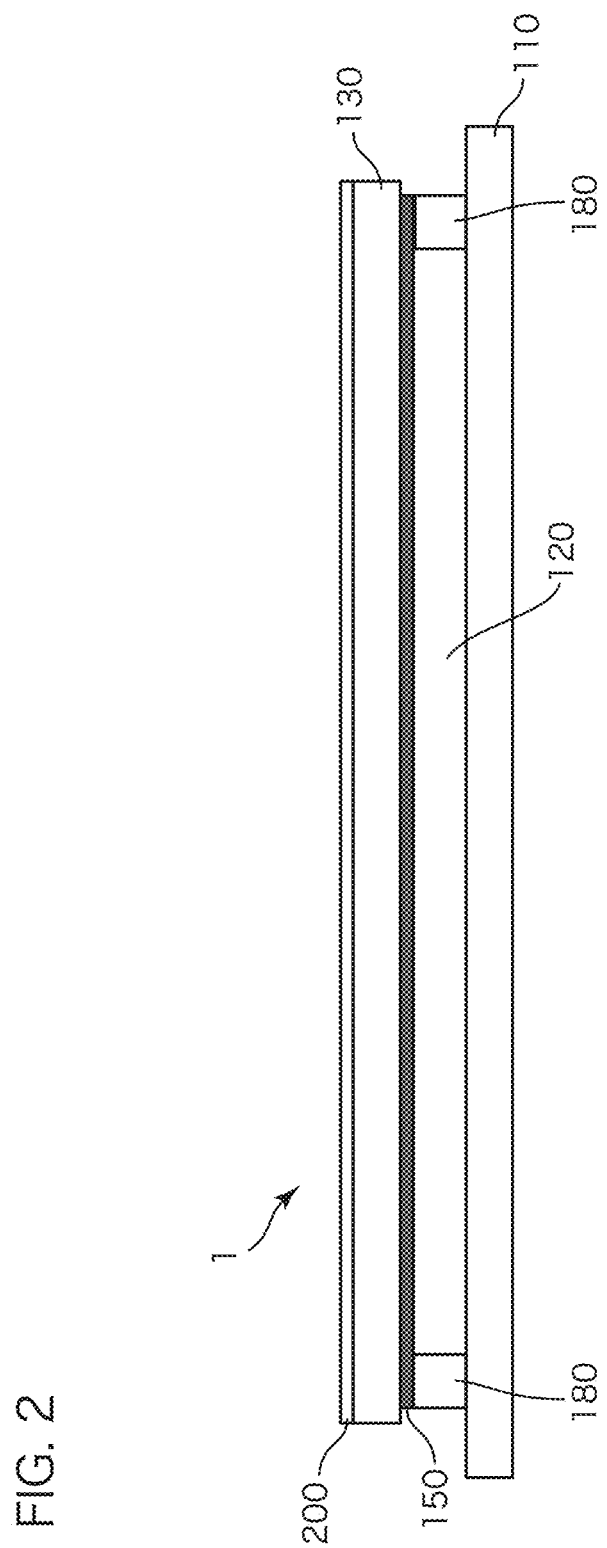
FIG. 2 is a side view illustrating the configuration of a main part of a liquid crystal display panel according to the present embodiment.

FIG. 1 is a plan view illustrating the configuration of a main part of a liquid crystal display panel according to an embodiment of the present application, and FIG. 2 is a side view thereof. A liquid crystal display panel 1 according to the present embodiment includes a TFT (Thin-Film transistor)-side glass substrate 110, a liquid crystal layer 120 and a CF (Color Filter)-side glass substrate 130.

The TFT-side glass substrate 110 is a rectangular substrate having translucency, and has an area slightly larger than that of the CF-side glass substrate 130. On one surface of the TFT-side glass substrate 110, for example, pixel electrodes and TFTs (not illustrated) corresponding to the respective display pixels arranged in matrix are formed. Furthermore, at the circumferential part of the TFT-side glass substrate 110, signal input parts 60, 60 . . . are provided to which scanning signals (or data signals) to the respective display pixels are input, and signal wirings for connecting the signal input parts 60, 60 . . . and the display pixels are formed on one surface of the TFT-side glass substrate 110.

The CF-side glass substrate 130 is a rectangular substrate having translucency and is provided to face the TFT-side glass substrate 110. On the surface of the CF-side glass substrate 130 that faces the TFT-side glass substrate, in addition to an opposite electrode (not illustrated), a light shielding layer 150 is provided which includes a black matrix 151 dividing the display region with a grid-like pattern to correspond to the respective display pixels and a frame part 152 shielding light in the region surrounding the display region. One of the features in the present embodiment is to provide the light shielding layer 150 (frame part 152) all the way to the vicinity of an edge part of the CF-side glass substrate 130, as illustrated in FIG. 2. It is noted that the frame part 152 has a rectangular shape while the edge of the frame part 152 is formed in parallel with the horizontal or vertical line of the display pixels aligned in the display region.

The TFT-side glass substrate 110 and the CF-side glass substrate 130 are bonded with a seal material 180 in the state where a gap is formed between the substrates, and a liquid crystal substance is enclosed in the gap to form a liquid crystal layer 120.

To the liquid crystal display panel 1 as described above, structures, such as a patterned retardation film, a polarization plate and a touch panel, for which the attachment positions are restricted depending on the alignment of display pixels may be attached. In the present embodiment, as illustrated in FIG. 2, a case will be described where a patterned retardation film 200 (hereinafter referred to as an FPR (Film-type Patterned Retarder) film 200) is bonded to the surface of the CF-side glass substrate 130, as an example, for its configuration.

Figure 3:
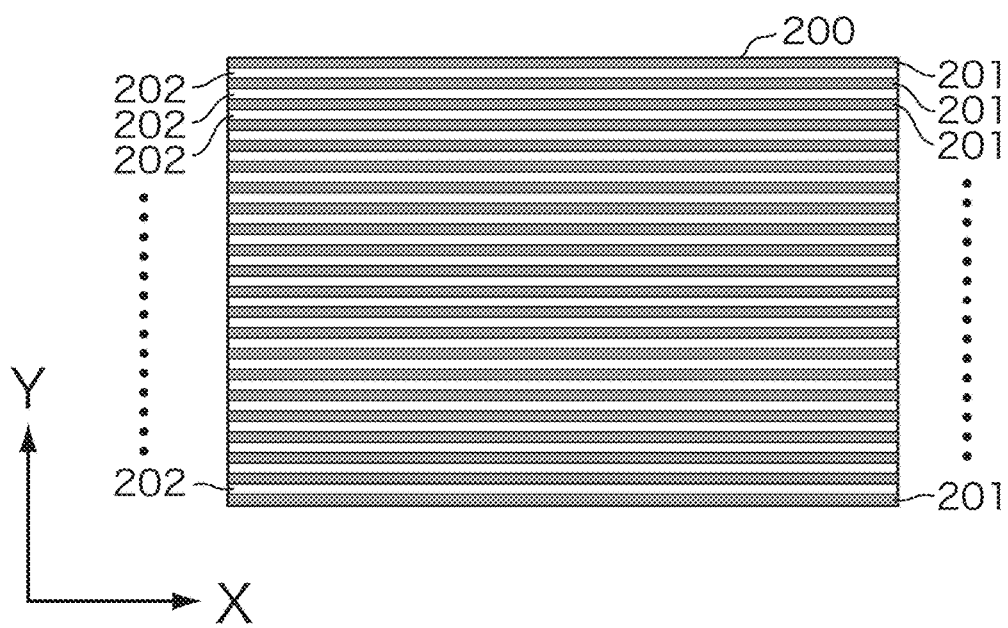
FIG. 3 is a plan view illustrating an example of an FPR film.
Figure 4:
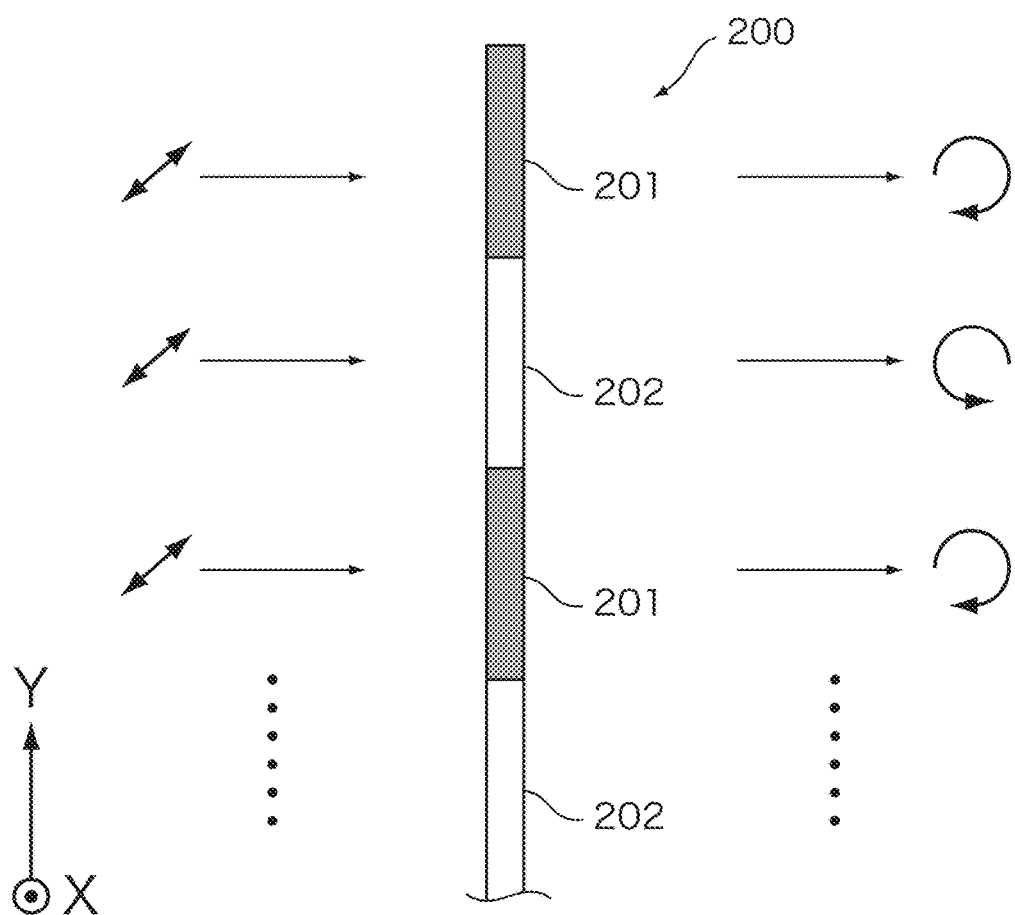
FIG. 4 is a vertical section view illustrating an example of an FPR film.

FIG. 3 is a plan view illustrating an example of an FPR film 200, and FIG. 4 is a vertical section view thereof. The FPR film 200 includes, for example, a first region 201 and a second region 202 for which at least one of an in-plane slow axis and an in-plane phase difference is different from each other, and has a stripe pattern in which the first region 201 and the second region 202 are alternately arranged. Each of the first region 201 and the second region 202 has a band-like shape extending in parallel to the horizontal direction (X-axis direction in the drawing). The FPR film 200 converts linearly-polarized light passing through the first region 201 into, for example, right circularly polarized light and linearly polarized light passing through the second region 202 into, for example, left circularly polarized light, to create two different types of polarization states.

The stripe pattern in the FPR film 200 is set in accordance with the positions of display pixels included in the liquid crystal display panel 1. Moreover, the vertical width (in the direction of Y-axis illustrated in FIG. 3) of the first region 201 and the vertical width of the second region 201 may be set in accordance with the dimensions of display pixels in the liquid crystal display panel 1. In the case where stereoscopic video display is performed in the liquid crystal display apparatus, a video image for the right eye which is to be viewed by the right eye and a video image for the left eye which is to be viewed by the left eye are displayed in the display region of the liquid crystal display panel 1. By associating one of the video image for the right eye and the video image for the left eye with the first region 201 of the FPR film 200 while associating the other one thereof with the second region 202 of the FPR film 200, the video image for the right eye will have the optical characteristic of the right circularly polarized light (or left circularly polarized light), whereas the video image for the left eye will have the optical characteristic of the left circularly polarized light (or right circularly polarized light). As a result, through the polarized glasses configured to set the polarization plate allowing the passage of only one of the polarized light for the right eye and the polarization plate allowing the passage of only the other one of the polarized light for the left eye, a viewer will recognize a video image as a stereoscopic video image.

In the case where such an FPR film 200 is bonded to the liquid crystal display panel 1, it is necessary to bond the FPR film 200 in alignment with the positions of display pixels that are divided by the black matrix 151 on the CF-side glass substrate 130. Thus, it is normally preferable that the CF-side glass substrate 130 is provided with an alignment mark indicating the positional reference for bonding and the FPR film 200 is bonded with reference to the alignment mark. In the case where the reference position located on the TFT-side glass substrate 110 is utilized, the position for bonding of the FPR film 200 may be affected by an error in bonding between the TFT-side glass substrate 110 and the CF-side glass substrate 130 and may thereby be displaced. In the present embodiment, however, as the light shielding layer 150 (frame part 152) is formed all the way to the vicinity of the edge part of the CF-side glass substrate 130, a sufficient space for an alignment mark cannot be ensured on the CF-side glass substrate 130, which makes it difficult to process the black matrix 151 provided on the CF-side glass substrate 130 to form an alignment mark.

In order to solve such a problem, according to the present application, alignment marks are formed at the circumferential edge of the TFT-side glass substrate 110.

Figure 5:
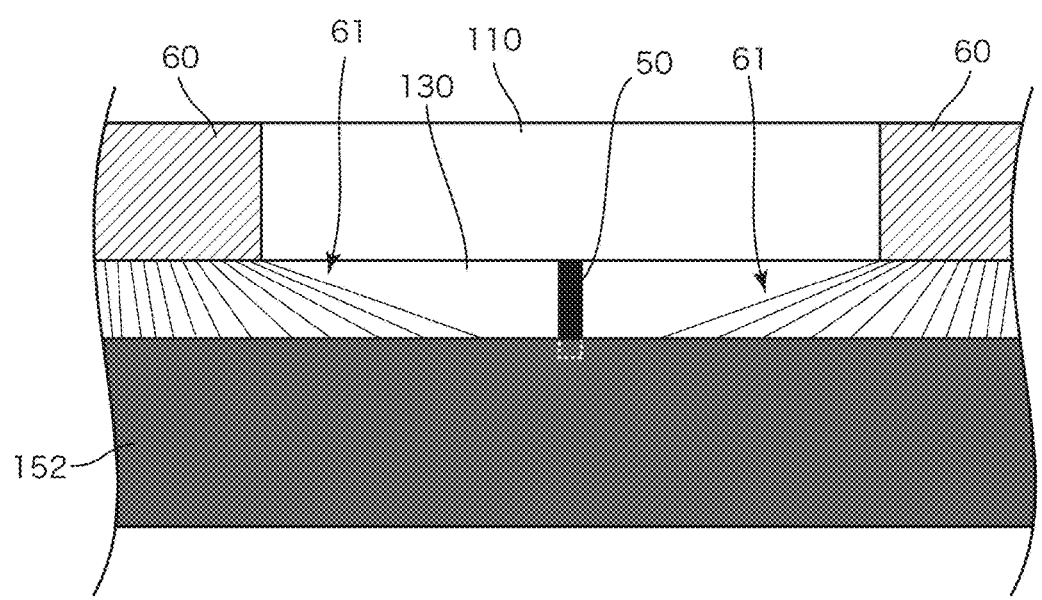
FIG. 5 is a schematic view illustrating an example of a position where an alignment mark is formed.

FIG. 5 is a schematic view illustrating an example of a position where an alignment mark is formed. As described earlier, in the liquid crystal display panel 1, a display region configured by display pixels is provided, while a frame part 152 formed in the same procedure as that for the black matrix 151 is provided at the circumference of the display region. At the circumferential edge of the frame part 152, the seal material 180 for sealing between the CF-side glass substrate 130 and the TFT-side glass substrate 110 with a liquid crystal substance is drawn. Furthermore, at the circumferential edge on one surface side of the TFT-side glass substrate 110, a plurality of signal input parts 60 through which scanning signals (or data signals) are input to the display pixels are provided.

The alignment mark 50 is formed in at least each of two parts of the circumferential edge of the TFT glass substrate 110. The example in FIG. 1 illustrates a configuration where two alignment marks 50, 50 are formed in the vicinity of the signal input parts 60, 60 . . . arranged side by side along the upper rim of the TFT-side glass substrate 110.

On the TFT-side glass substrate 110, in addition to the signal input parts 60, wiring patterns 61 for connecting the signal input parts 60 with the display pixels (pixel electrodes and TFTs) are formed, while the alignment marks 50, 50 . . . are preferably formed in regions where such signal input parts 60 and wiring patterns 61 are not formed. This is because the alignment marks 50, 50 may be difficult to be recognized from the outside in the case where the signal input parts 60 and the wiring patterns 61 formed on the surface of the TFT-side glass substrate 110 are overlapped with the alignment marks 50, 50.

Figure 6:
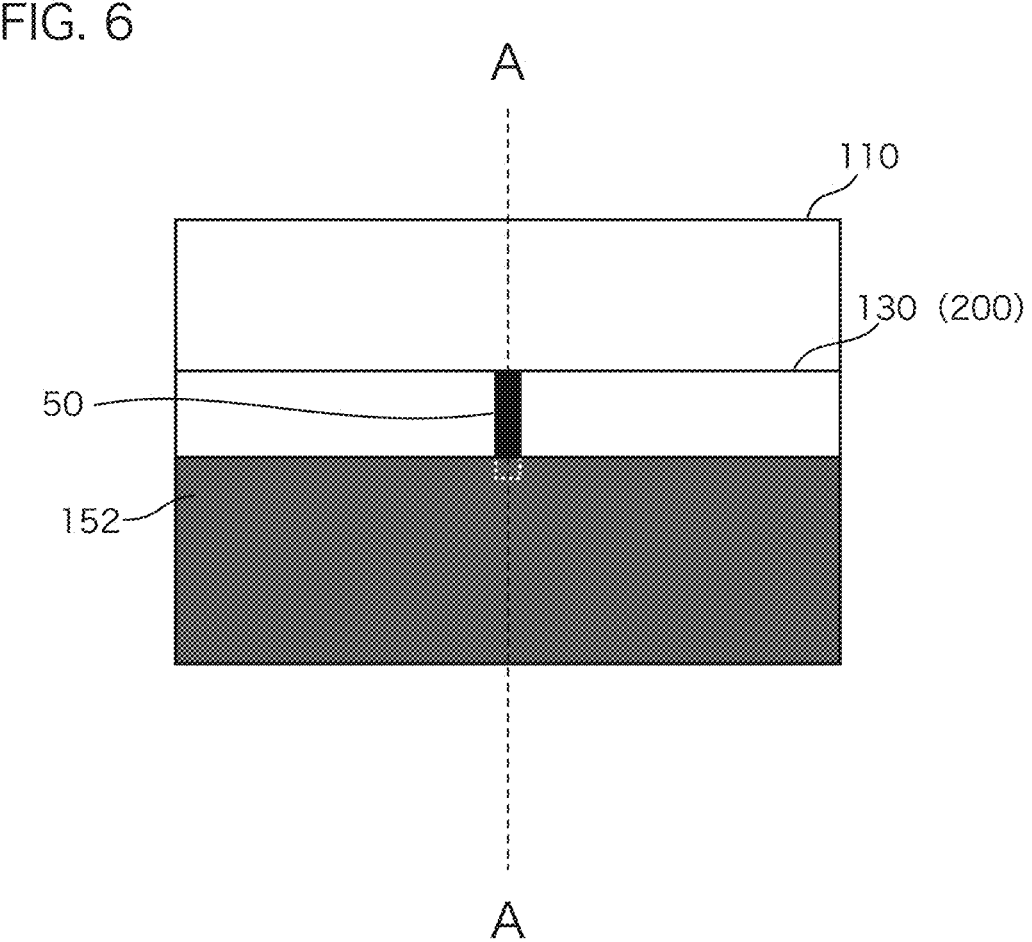
FIG. 6 is a partially enlarged view of a region in the vicinity of an alignment mark.
Figure 7:
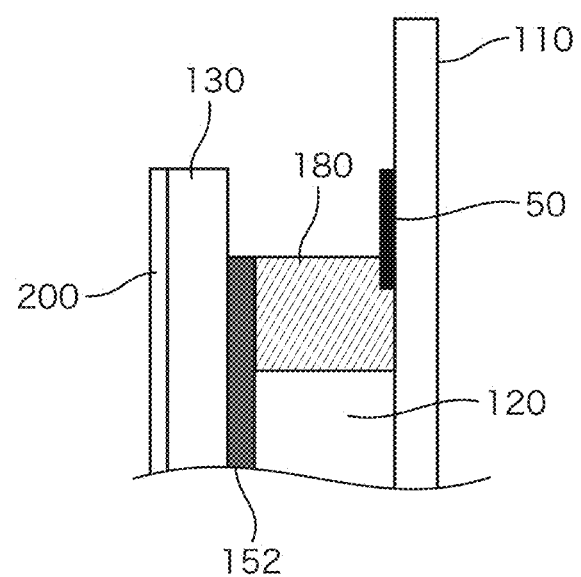
FIG. 7 is a section view taken along the line A-A illustrated in FIG. 6.

FIG. 6 is a partially enlarged view of a region in the vicinity of an alignment mark 50, and FIG. 7 is a section view taken along the line A-A illustrated in FIG. 6. The alignment mark 50 has a linear shape with a length of approximately 0.25 mm and a line width of approximately 0.04 mm. It is preferable that, in plan view, the alignment mark 50 crosses the edge of the frame part 152 at an angle of approximately ninety degrees in plan view and a part of the alignment mark 50 (approximately 0.05 mm on the lower side, for example) overlaps with the frame part 152. Such an alignment mark 50 may be formed on the TFT-side glass substrate 110 with the same material as that of the wiring pattern 61 in the same procedure as the procedure for forming the wiring pattern 61 on the TFT-side glass substrate 110.

Since a camera's field of view for reading the alignment mark 50 corresponds to the region of approximately 1 mm×1 mm, it is preferable that no similar pattern which may cause an error in reading of the alignment mark 50 is present in the region of approximately 0.5 mm×0.5 mm from the center of the alignment mark 50.

Using such an alignment mark 50 as a reference, the FPR film 200 may be bonded to the CF-side glass substrate 130. By reading the crossing part of the alignment mark 50 and an edge of the frame part 152 with a camera and referring to the edge of the frame part 152, the alignment of the FPR film 200 in the up-down direction may be achieved. Moreover, by referring to the left and right edges of the alignment mark 50, the alignment of the FPR film 200 in the left-right direction may be achieved. In other words, alignment in the left-right direction may be performed according to the left and right edges of the alignment mark 50 while the edge of the frame part 152 is so positioned as to be in parallel with the first region 201 and the second region 202 of the FPR film 200 (boundary between the first region 201 and the second region 202, for example) to bond the FPR film 200 to the CF-side glass substrate 130. This allows different retardation regions of the FPR film 200 to correspond to the positions of pixels in each line for displaying a video image for the right eye or a video image for the left eye.

Figure 8:
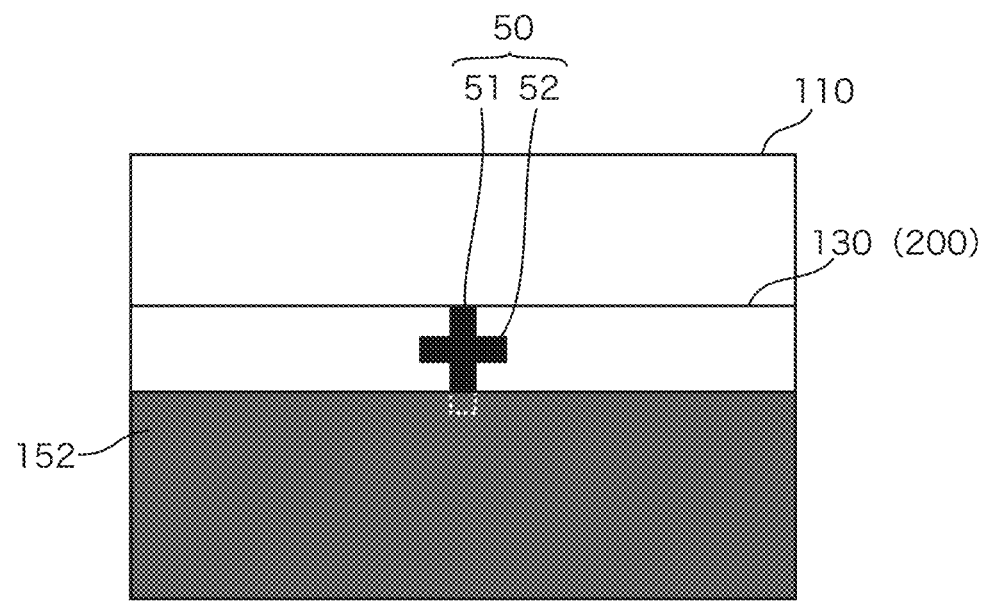
FIG. 8 is a schematic view illustrating another shape of an alignment mark.

Though, in the present embodiment, the alignment mark 50 has a linear shape, it is not limited to the linear shape. FIG. 8 is a schematic view illustrating another shape of the alignment mark 50. The alignment mark 50 illustrated in FIG. 8 is a cross-shaped mark. The alignment mark 50 includes a crossing part 51 which crosses the edge of the frame part 152 at an angle of approximately ninety degrees, and a parallel part 52 orthogonal to the crossing part 51 (that is, in parallel with the edge of the frame part 152).

In the case where the FPR film 200 is bonded to the CF-side glass substrate 130 using such an alignment mark 50 as a reference, the crossing part in the alignment mark 50 is read with a camera. The alignment of the FPR film 200 in the up-down direction may be achieved by referring to the edges in the up-down direction of the parallel part 52, whereas the alignment of the FPR film 200 in the left-right direction may be achieved by referring to the edges in the left-right direction of the crossing part 51.

Moreover, while the alignment mark 50 is formed in a linear shape in FIG. 6 and the alignment mark 50 is formed in a cross shape in FIG. 8, it is to be understood that the alignment mark 50 may have a hollow metal shape made by hollowing out a part of metal formed on the TFT-side glass substrate 110.

Furthermore, while the present embodiment has a configuration where the alignment mark 50 is formed as an independent mark, another configuration may also be employed in which a mark is formed utilizing a part of the wirings on the wiring patterns 61 (see FIG. 5).

Figure 9:
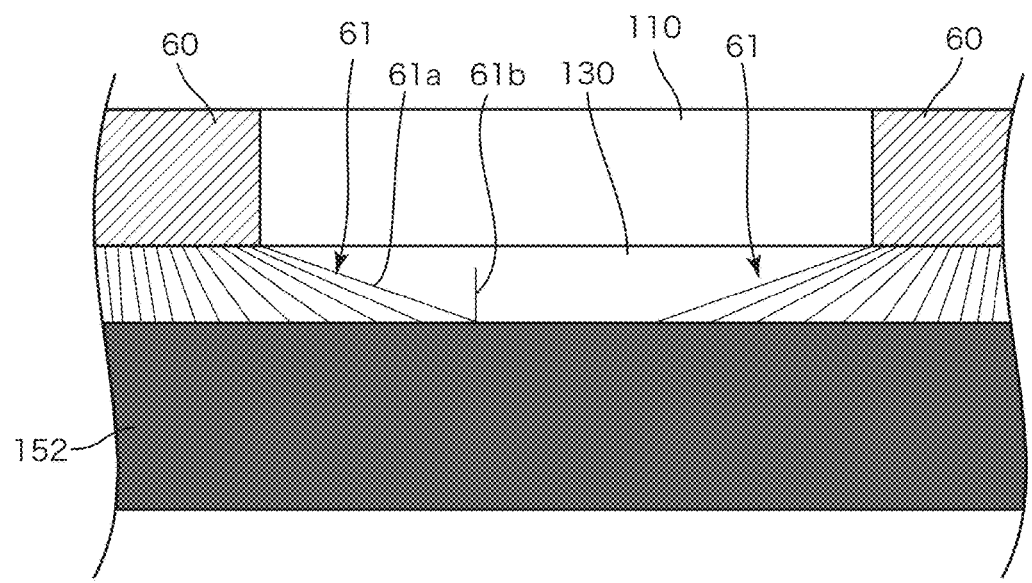
FIG. 9 is a schematic view illustrating an example of an alignment mark utilizing a part of wirings in a wiring pattern.

FIG. 9 is a schematic view illustrating an example of an alignment mark using a part of wirings in a wiring pattern. As described earlier, though a wiring pattern 61 made of multiple wirings is formed between the signal input part 60 and the frame part 152, the outermost wiring 61a in the wiring pattern 61 is not the wiring for transmitting scanning signals and data signals. Such a configuration may also be possible that the wiring 61a is extended to form an alignment mark 61b indicating the positional reference for bonding a structure such as the FPR film 200.

The alignment mark 61b illustrated in FIG. 9 is a linear mark formed by extending wiring from the midway of the outermost wiring 61a in the wiring pattern 61 in a direction crossing the edge of the frame part 152 at an angle of approximately ninety degrees. Such an alignment mark 61$b$ may be formed on the TFT-side glass substrate 110 with the same material as that of the wiring pattern 61 in the same procedure as the procedure for forming the wiring pattern 61. Since a camera's field of view for reading the alignment mark 61$b$ corresponds to the region of approximately 1 mm×1 mm, it is preferable that no similar pattern which may cause an error in reading of the alignment mark 61$b$ is present in the region of approximately 0.5 mm×0.5 mm from the center of the alignment mark 61$b$.

Though the example in FIG. 9 illustrates the alignment mark 61$b$ formed from the midway of the wiring 61$a$, a mark extending from one end of the wiring 61$a$ in a direction crossing the edge of the frame part 152 at an angle of approximately ninety degrees may also be employed.

Figure 10:
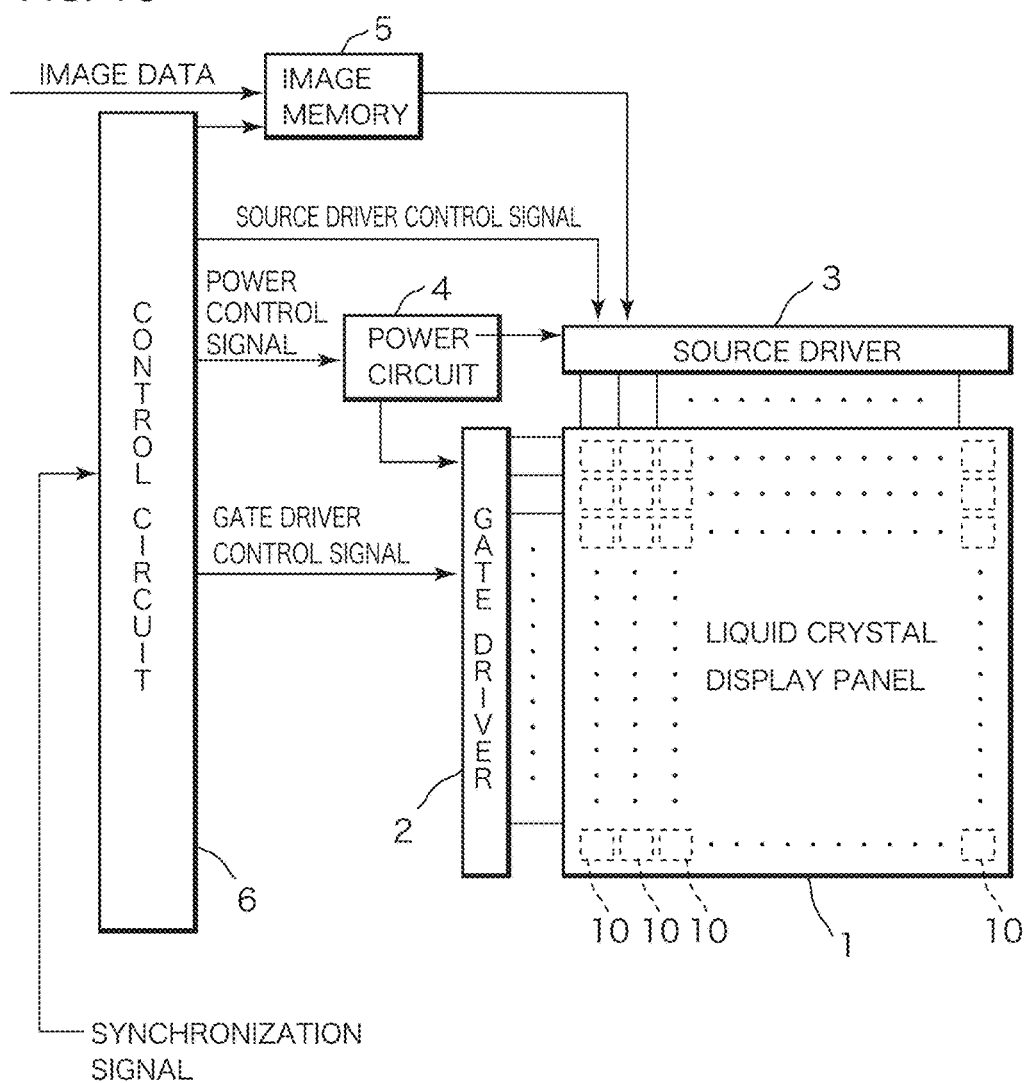
FIG. 10 is a schematic view illustrating the configuration of a driving system of a liquid crystal display apparatus according to the present embodiment.

Next, the configuration of a liquid crystal display apparatus using the liquid crystal display panel according to the present embodiment is described. FIG. 10 is a schematic view illustrating the configuration of a driving system of a liquid crystal display apparatus according to the present embodiment. The display apparatus according to the present embodiment is a liquid crystal display apparatus including, for example, a liquid crystal display panel 1, a gate driver 2, a source driver 3, a power circuit 4, an image memory 5 and a control circuit 6.

The liquid crystal display panel 1 includes multiple display elements 10, 10, 10 . . . arranged in matrix manner. Portions between adjacent display elements are shielded from light by the black matrix 151, with which the display elements 10 are divided so as to function as display pixels.

Each display element 10 in the liquid crystal display panel 1 includes a pixel electrode (not illustrated) formed on the TFT-side glass substrate 110, an opposite electrode (not illustrated) formed on the CF-side glass substrate 130 and a liquid crystal layer 120 enclosed between the pixel electrode and the opposite electrode. The control circuit 6 controls the magnitude of voltage to be applied to each display element 10 through the gate driver 2 and source driver 3, to adjust the light transmittance of the liquid crystal layer 120 in each display element 10 and decide the display luminance in each display pixel.

In order to control the voltage to be applied to the liquid crystal layer 120 in each display element 10, the control circuit 6 generates a memory control signal, a power control signal, a source driver control signal and a gate driver control signal based on a synchronization signal input from the outside, and outputs the generated control signals to an image memory 5, a power circuit 4, a source driver 3 and a gate driver 2, respectively.

The image memory 5 temporarily stores input display data and outputs pixel data to be displayed on the liquid crystal display panel 1 to the source driver 3 in synchronization with the memory control signal input from the control circuit 6. It is to be noted that the image memory 5 may be included internally in the control circuit 6 and output image data to the source driver 3 after going through internal processing in the control circuit 6.

Here, the input synchronization signal and display data may be included in, for example, an LCD signal output from a CPU or an LCD control IC mounted on a mobile telephone, portable game machine or the like, a signal obtained by performing A/D conversion on a CRT output signal from a personal computer (PC), and a signal obtained by the control circuit 6 directly controlling the video RAM mounted on a PC or the like.

The power circuit 4 generates a drive voltage for the gate driver 2 and a drive voltage for the source driver 3 in synchronization with the power control signal input from the control circuit 6, and outputs the voltages to the gate driver 2 and the source driver 3, respectively.

The gate driver 2 sequentially outputs a control voltage for performing on/off control of the switching element provided in the display element in synchronization with the gate driver control signal input from the control circuit 6, and applies the control voltage to the gate wiring which is a scanning line.

In synchronization with the source driver control signal input from the control circuit 6, the source driver 3 takes in pixel data output from the image memory 5 and sequentially outputs the signal voltage corresponding to the pixel data. The signal voltage output from the source driver 3 is supplied to the display element 10 through the source wiring which is a signal line in the case where the corresponding switching element is on.

In the case where a stereoscopic video image is displayed at a liquid crystal display apparatus, a video image for the right eye and the video image for the left eye are alternately displayed line by line in the display region of the liquid crystal display panel 1. For example, in the case where the liquid crystal display panel 1 has a resolution of full HD (i.e. 1920 dots×1080 lines), a video image for the right eye and a video image for the left eye each corresponding to 1920 dots×540 lines are prepared to alternately display the video image for the right eye and the video image for the left eye line by line.

As described above, according to the present embodiment, a marker (alignment mark 50) indicating the positional reference for attaching a structure such as the FPR film 20 may be formed on the TFT-side glass substrate 110 on which the TFT wiring and the like are formed, without an addition of a new procedure. The alignment mark 50 formed from the black matrix 151 may be a cause of electrostatic discharge (ESD) depending on the shape of the alignment mark. In the present application, however, the alignment mark 50 may, for example, be formed without processing the black matrix 151, which can suppress the occurrence of electrostatic discharge.

Though the present embodiment has such a configuration that two alignment marks 50, 50 are formed in the vicinity of the signal input parts 60, 60 . . . arranged side by side along the upper rim of the TFT-side glass substrate 110, the positions for forming the alignment marks 50, 50 are not limited to these positions. For example, in addition to the two alignment marks on the upper rim side described earlier, alignment marks 50, 50 may also be formed along the lower rim of the TFT-side glass substrate 110. For example, in the case where alignment marks 50, 50 are added to symmetrical positions with respect to the up-down direction of the TFT-side glass substrate, even if a reading failure occurs for the two alignment marks 50, 50 at the upper rim (or the lower rim), it is possible to read the other two alignment marks 50, 50 by inverting the upper and lower sides of the liquid crystal panel 1.

Furthermore, alignment marks 50, 50 formed at two parts on the left rim or two parts on the right rim of the TFT-side glass substrate 110 may also be included. By adding the alignment marks 50, 50 at two parts on the left or right rim, it is possible to determine the attachment positions not only for the left-right direction but also for the up-down direction with reference to the alignment marks 50, 50.

While the present embodiment has described the configuration in that the FPR film 200 is attached to the liquid crystal display panel 1, it is understood that the method of the present application may also be applicable to the case where a structure which is restricted for its attachment position depending on the arrangement of display pixels, such as a patterned retardation film, a polarization plate or a touch panel, is attached to a display panel such as a PD panel or an organic EL panel.

The embodiments disclosed herein are to be construed as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims. Moreover, the technical features disclosed in the embodiments can be combined with one another.

It is noted that, as used herein and in the appended claims, the singular forms "a", "an", and "the" include plural referents unless the context clearly dictates otherwise.

The invention claimed is:

1. A display panel, comprising:
 a plurality of display elements arranged in a matrix manner;
 a first transparent substrate including a plurality of signal input parts at a circumferential part of the first transparent substrate and a wiring connecting the signal input parts and the display elements formed on the first transparent substrate; and
 a second transparent substrate including a rectangular light shielding layer shielding light among the display elements and shielding light at an outside of a display region including the display elements, wherein
 marks for indicating positions with respect to the display elements are located in at least two parts of a circumferential edge portion of the first transparent substrate, and
 each of the marks is a cross shaped mark which includes a line shaped crossing portion extending from outside of an area covered by the light shielding layer toward the area and being substantially perpendicular to an edge of the area, and a parallel portion provided outside of the area and being substantially perpendicular to the crossing portion.

2. The display panel according to claim 1, wherein
 a seal member for bonding the first transparent substrate to the second transparent substrate is provided in a peripheral portion of the light shielding layer so that an outer edge of the seal member overlaps an outer edge of the light shielding layer, and
 the marks are provided outside of the seal member.

3. The display panel according to claim 1, wherein the mark is formed with a same material as a material of the wiring.

4. The display panel according to claim 1, wherein the mark is provided in a region not overlapping with the signal input parts.

5. The display panel according to claim 1, further comprising a structure attached onto the second transparent substrate, and restricted for an attachment position depending on an arrangement of the display elements.

6. The display panel according to claim 5, wherein the structure is a patterned retardation film converting a polarization state of light transmitted through the first and second transparent substrates into two different types of polarization states.

7. A display apparatus, comprising:
 the display panel according to claim 1; and
 a driving part driving a plurality of display elements included in the display panel.

8. The display apparatus according to claim 7, wherein the crossing portion crosses any one of rims at a circumferential edge of the light shielding layer at an angle of approximately ninety degrees.

9. The display apparatus according to claim 7, wherein the mark is provided at an outer side of a seal member for bonding the first transparent substrate to the second transparent substrate.

10. The display apparatus according to claim 7, wherein the mark is formed with a same material as a material of the wiring.

11. The display apparatus according to claim 7, wherein the mark is provided in a region not overlapping with the signal input parts.

12. The display apparatus according to claim 7, further comprising a structure attached onto the second transparent substrate, and restricted for an attachment position depending on an arrangement of the display elements.

13. The display apparatus according to claim 12, wherein the structure is a patterned retardation film converting a polarization state of light transmitted through the first and second transparent substrates into two different types of polarization states.

14. The display panel according to claim 1, wherein the wiring comprises a plurality of wirings formed between the signal input parts and the light shielding layer.

15. The display panel according to claim 14, wherein an outermost wiring of the plurality of wirings is not configured for transmitting signals and the outermost wiring is extended to form the mark.

* * * * *